United States Patent [19]
Donoghue et al.

[11] Patent Number: 5,155,813
[45] Date of Patent: Oct. 13, 1992

[54] COMPUTER APPARATUS FOR BRUSH STYLED WRITING

[75] Inventors: Karen Donoghue, Melrose, Mass.; Kenneth C. Knowlton, Merrimack, N.H.

[73] Assignee: Wang Laboratories, Inc., Lowell, Mass.

[21] Appl. No.: 753,014

[22] Filed: Aug. 23, 1991

Related U.S. Application Data

[63] Continuation of Ser. No. 462,001, Jan. 8, 1990, abandoned.

[51] Int. Cl.$^5$ .................... G06F 3/00; G06F 15/62
[52] U.S. Cl. ................................. 395/275; 340/706
[58] Field of Search ............... 395/275; 340/706, 707; 178/18; 382/3, 13, 25, 54, 55

[56] References Cited

U.S. PATENT DOCUMENTS

| | | | |
|---|---|---|---|
| 4,318,096 | 3/1982 | Thornburg et al. | 340/706 |
| 4,564,928 | 1/1986 | Glenn et al. | 367/117 |
| 4,639,720 | 1/1987 | Rympalski et al. | 340/712 |
| 4,646,076 | 2/1987 | Wiedenman et al. | 340/747 |
| 4,705,942 | 11/1987 | Budrikis et al. | 250/227 |
| 4,739,317 | 4/1988 | Berry et al. | 340/723 |
| 4,758,965 | 7/1988 | Liang et al. | 364/518 |
| 4,791,582 | 12/1988 | Ueda et al. | 364/522 |
| 4,860,372 | 8/1989 | Kuzunuki et al. | 382/13 |
| 4,901,251 | 2/1990 | Sfarti | 364/521 |
| 4,962,468 | 10/1990 | Beauregard et al. | 364/521 |

FOREIGN PATENT DOCUMENTS

| | | |
|---|---|---|
| 0367405 | 5/1990 | European Pat. Off. |
| 57-163038 | 9/1983 | Japan |
| 58-163038 | 9/1983 | Japan |
| 63-44222 | 2/1988 | Japan |
| 63-138415 | 6/1988 | Japan |
| 0121519 | 1/1989 | Japan |

OTHER PUBLICATIONS

"Computerized Generation of High Quality Fonts of the Japanese Alphabets", by Sakamoto and Takagi, COMPINT 85, 786–791 (1985).

"Hairy Brushes" by Strassmann, SIGGRAPH'86, Conf. in Dallas, TX, Aug. 18-22, 1986, ACM vol. 20, No. 4, pp. 225-232 (1986).

"MAX" Brochure and Markeing Information from TDS-Numonics, LTD England, Aug.-Sep. 1989.

"An Input Method of Calligraphic Characters Using Pressure Sensing Pen" by Chon-ming Shi et al. in the proceedings of the 1988 IEEE International Conference on Systems, Man and Cybernetics, Aug. 8-12, 1988 Beijing and Shenyang, China.

Primary Examiner—Dale M. Shaw
Assistant Examiner—Glenn A. Auve
Attorney, Agent, or Firm—Michael H. Shanahan

[57] ABSTRACT

A computer based system for brush writing (calligraphy) employs a stylus operable on a working surface in a brush imitating manner. A digital processor receives signals indicative of stylus strokes during operation of the stylus, and establishes, in real time, images of brushed strokes. The images of brushed strokes correspond to the brush imiating operation of the stylus and are displayed in real time or printed at a desired later time. Geometric characteristics of the images of brushed strokes vary as a function of detected parameters of stylus operation. The function is user definable through a graph screen view. A teardrop shaped drawing primitive which changes as a function of stylus operation provides images of brushed strokes of Eastern calligraphy. A line primitive which changes as a function of stylus operation provides images of brushed strokes of Western calligraphy.

18 Claims, 8 Drawing Sheets

COMPUTER APPARATUS FOR BRUSH STYLED WRITING

This is a continuation of co-pending application Ser. No. 07/462,001 filed on Jan. 8, 1990 now abandoned.

RELATED APPLICATIONS

The following includes subject matter related to that of U.S. Pat. application Ser. No. 07/396,739 which is a continuation of 200,091 filed May 27, 1988, now abandoned, assigned to the assignee of the present invention and herein incorporated by reference.

BACKGROUND OF THE INVENTION

"Calligraphy" is the art of fine writing. Nowadays in various countries throughout the world, writing for practical purposes is done using pencil or pen, though brush and ink calligraphy is still widely practiced as a separate art. In the Western culture, calligraphy is typically performed using a rigid broad edged pen. An Old English style print is one of the most commonly used styles of Western calligraphy. In this style, stroke width of a character varies usually at the ends of a linear stroke and/or along a portion of a curved stroke. This is accomplished by stroke width being a function of the direction in which the pen is travelling, the angle at which the nib (rigid broad edge) is held with respect to a horizontal axis on the writing surface, and to some degree, force applied to the pen. Some characters require a turning or twisting of the pen between the fingers to vary stroke width in appropriate positions.

In Asian cultures, particularly in China and Japan, calligraphy is typically performed using a simple brush formed of a handle and bristles attached to one end of the handle. Chinese or Japanese calligraphy is called Kanji. Each Kanji character is comprised of a number of strokes where the ordering of the strokes and their form is strictly defined by the type of script to which the character belongs. Some characters are so complicated that they are comprised of more than 30 strokes.

Most, if not all, calligraphy is still performed by brush and ink as described above. One of the problems of inputting calligraphy into a computer system, and more generally of data processing in Asian cultures, is the difficulty in entering Asian calligraphy through a keyboard. Generally in data processing in Asian cultures, a single character is broken down into its constituent strokes and each stroke corresponds to a key on a typical keyboard. Depending on the complexity of the character there can be few or many keystrokes needed to enter a single character. The complexity of an average Kanji character and the thousands of characters in the language make inputting data for a form, for example, an extremely difficult task for someone who is not an expert Kanji typist. Hence, there is a need for a less complicated method for inputting Kanji (calligraphy) characters into a computer system.

Inputting devices other than the keyboard have been considered but with little to no advantage. Kanji characters made with a ball point pen or other non-force-sensitive writing implement lack proper visual feedback. C.G. Leedham and A.C. Downton in "On-line Recognition of Pittman's Handwritten Shorthand - an Evolution of Potential", *International Journal of Man-Machine Studies*, Volume 24, Pages 375-393 (1986) showed that the lack of proper visual feedback affects writing dynamics and changes writing style, as well as the process of stroke creation. Using a ball point pen to create a syntactically correct, force sensitive Kanji stroke would require the writer to scribble over sections of the stroke in order to show variability in stroke thickness. Of course, force sensing is not enough to provide perfectly realistic visual feedback, but it aids in providing visual feedback closer to what the writer expects.

Most "brushes" in computer-based paint systems are incapable of giving realistic brush stroke feedback dependent on force applied to the brush, size and shape of the brush, and speed of brush stroke. In addition, most "brushes" in computer based paint systems use a single static drawing primitive repeatedly drawn as a function of the movement of the input device. In some systems such as FullPaint (from Ann Arbor Softwares, Inc.) and SuperPaint (Copyright 1986, Bill Snyder) available for the MacIntosh of Apple Computer, Inc., as the input device, the mouse, moves from point A to point B, the entire path joining the two points is filled with "paint". The user can not dynamically change drawing primitives during the creation of a stroke, except by going to a menu and choosing a submenu for brush shape and/or size. In other computer based paint systems, the single primitive itself is drawn at each sample point, giving a non-continuous series of dots or filled circles, or whatever geometric shape the drawing primitive happens to be.

Further, computer based paint systems that use a 2-D mouse as their input device are not capable of expressing stroke width as a function of force. For applications that require the input device to be sensitive to force, these computer based paint systems do not work well. Steve Strassman in "Hairy Brushes", *SIGGRAPH Proceedings* 1986, Volume 20, No. 4, Pages 225-232, modelled a non-real-time brush as a compound object composed of bristles, and kept track of the physical state of the brush and remaining amount of ink over the course of the stroke. Strassman's "stroke" is described as a path whose constituting control points each have a force value associated with them. The force value for each control point is input by the user through the keyboard.

Accordingly there is a need for a computer based system for brush writing (i.e. calligraphy).

SUMMARY OF THE INVENTION

The present invention provides computer writing apparatus in a data processing system. To support the writing apparatus, the data processing system includes a digital processor, a stylus coupled to the digital processor, processor means, a display unit (e.g. a video display), and a hard copy output means, such as a local and/or remote printer. The stylus is operable on a working surface in a brush imitating manner. During operation of the stylus in a brush imitating manner, signals are generated for the processor means and are indicative of strokes the user has defined with the stylus on the working surface. In response to the generated signals, the processor means establishes, in real time, images of brushed strokes which correspond to the brush imitating operation of the stylus. The processor means displays the established images of brushed strokes on the video display unit of the data processing system.

The signals generated during operation of the stylus include a force signal and signals indicative of direction of stylus movement, length of time the stylus has been in contact with the working surface, distance the stylus has travelled while being in contact with the working surface and/or some other stroke defining parameter. The processing means provides images of brushed strokes with geometric characteristics (e.g. sizes, shapes and orientation) that vary as a function of one or more of the generated signals. In particular, force detecting means are coupled to the processor means for detecting the force exerted between the stylus and working surface during operation of the stylus. The processing means provides images of brushed strokes with geometries (e.g. shape, size and/or widths) that vary as a function of detected force.

Further, the function for determining dependent geometric characteristics (e.g. shape and/or width) of a brushed stroke from detected parameters of stylus operation (e.g. force) is user definable. That is, the function for mapping a force measurement into a brushed stroke width in one embodiment is user definable. This is accomplished through a graph view displayed on the display unit of the data processing system. The graph view provides orthogonal axes, one for indicating force and the other for indicating brushed stroke width. To define a desired function of force to brushed stroke width, the user draws in the graph view a curve indicative of the desired relationship between force and stroke width.

In a further aspect of the present invention, the images of brushed strokes provided by the processor means are each defined by a series of teardrop shaped elements or primitives. In a preferred embodiment, each teardrop shaped element is oriented with the teardrop tip at 135. from the right hand horizontal. And each teardrop shaped element approximates the consolidated shape of brush bristles in contact with the writing surface when a brush is held in correct Kanji form.

Each teardrop shaped element is defined by a plurality of points around its perimeter. A subroutine employed by the processor means for forming each brushed stroke image on a bitmap (i) determines points of the teardrop shaped elements which lie on a perimeter boundary enclosing successive teardrop shaped elements, (ii) establishes with the determined points trapezoidal areas within and including the perimeter boundary, and (iii) sets pixels in a pattern corresponding to the established trapezoidal areas.

Alternatively, the images of brushed strokes provided by the processor means are each formed of a series of lines of variable lengths. Each line is defined by a plurality of points and has a length determined by detected force between the stylus and working surface during operation of the stylus. The subroutine employed by the processor means forms each brushed stroke image on a bitmap by (i) determining points of the lines which lie on a perimeter boundary about the series of lines, (ii) establishing with the determined points trapezoidal areas within and including the perimeter boundary, and (iii) setting pixels in a pattern corresponding to the established trapezoidal areas.

As a result, the images of brushed strokes are displayed on the video display unit without noticeable delay and provide for proper eye hand coordination of the user. To that end, the user is able to write as he/she would with pen and ink.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1c is a block diagram of a tablet employed in the system of FIG. 1a.

FIG. 2a is a schematic diagram of a tear-shaped primitive employed in images of brushed strokes created in the system of FIG. 1a.

FIG. 2b is a schematic diagram of a brushed stroke segment formed by two successive points generated during the operation of the stylus on the tablet in the system of FIG. 1a.

FIG. 2c is a schematic diagram of the filling of a brushed stroke by a polygon fill routine performed in the system of FIG. 1a.

FIGS. 2d–2e are schematic illustrations of the formation of imaged strokes in the system of FIG. 1a.

DETAILED DESCRIPTION OF THE PREFERRED EMBODIMENT

A data processing system embodying the present invention is described in related U.S. Pat. application Ser. No. 07/396,739 and herein incorporated by reference. A summary description involving only the parts of that data processing system which are pertinent to the present invention follows.

Figure 1A:
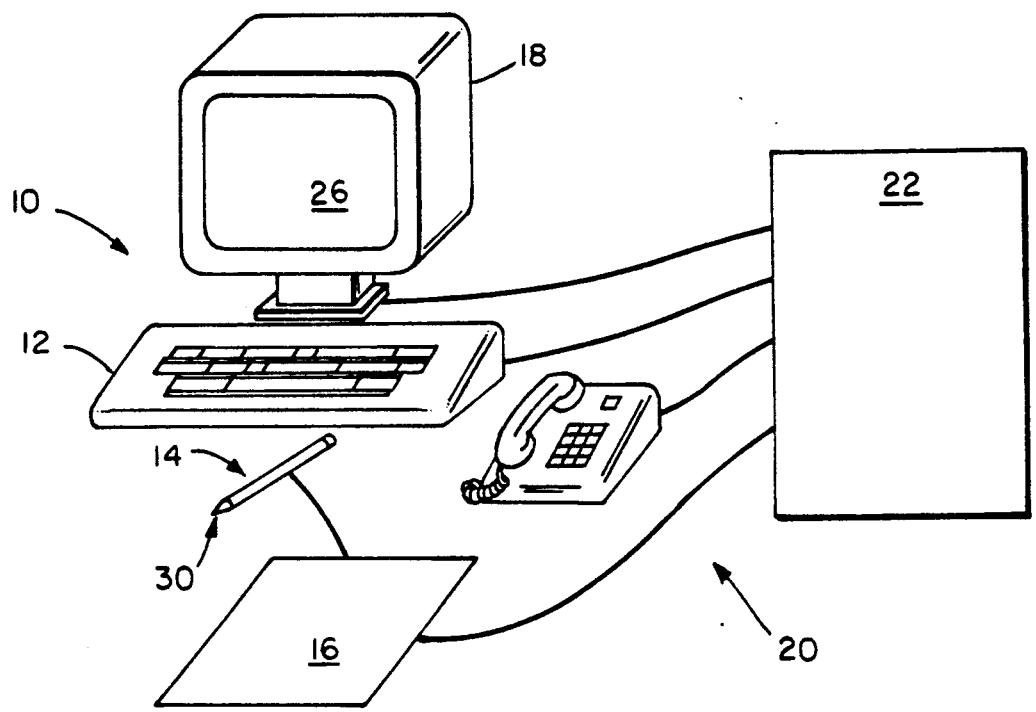
FIG. 1a is a schematic view of a data processing system which embodies the present invention.

As illustrated in FIG. 1a, the data processing system 20 includes a computer terminal 10 with a keyboard 12 and a display unit 18, an electronic stylus 14 and an electronic tablet 16, all of which are connected to and driven by a digital processor 22. Digital processor 22 is an Intel 80286 processor with added memory and a separate graphics processor (for example, a Texas Instrument 34010 graphics processor coupled to display unit 18), but it is understood that other processors of a single-tasking type may be used.

The stylus 14 is operated on an upper planar surface of tablet 16 in a manner that a calligraphy brush is used on a piece of paper. The strokes of the stylus 14 on the surface of the tablet are displayed on the display unit 18. That is, while the user applies stylus 14 in a brush imitating manner to the tablet surface, image representations of brushed strokes corresponding to the user's actions with the stylus are provided in the view 26 of display unit 18.

Further, the positions in the plane of the tablet surface correspond to positions in the plane of view 26 displayed on display unit 18. That is, stylus 14 operation on the upper left hand corner of the tablet surface produces brushed stroke images in the upper left hand corner of screen view 26, and stylus operation on the lower right hand corner of tablet surface produces brushed stroke images in the lower right hand corner of screen view 26, and so forth.

The geometric characteristics (e.g. size, orientation, shape) of each brushed stroke image displayed on display unit 18 in response to stylus operation on tablet 16 are processor determined from measurable aspects of stylus operation. These measurable aspects include x and y position of the stylus 14 on the tablet 16, force exerted between the stylus and tablet during operation of the stylus, direction of movement of the stylus in the plane of the tablet surface, length of time of stylus contact with the tablet surface, and distance the stylus has traversed while in contact with the table surface. Different ones of these measurable aspects or combinations of two or more thereof are used to define the different geometric characteristics of the brushed stroke images. As a result, the displayed images of brushed strokes are generated as a function of stylus operation in a brush imitating manner. To that end, the data processing system of the present invention provides an apparatus and method for inputting calligraphy characters into a computer system and for doing so in a manner which emulates pen and ink writing.

In a preferred embodiment, detected force exerted between the stylus 14 and tablet surface determines the shape and width of the brushed stroke images displayed on display unit 18. Hence, the displayed images of brushed strokes correspond to strokes expected by the user for the force sensitive operation of a pen/brush (stylus 14) on a writing surface (tablet 16).

Figure 1B:
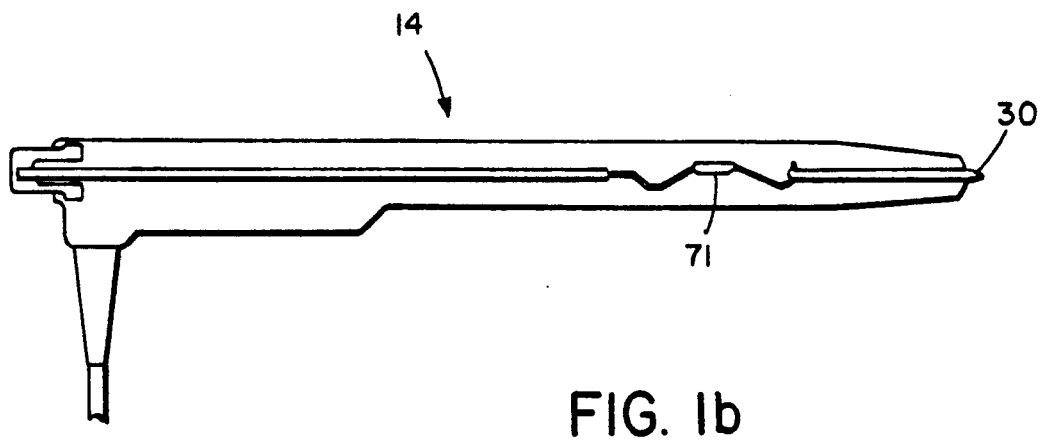
FIG. 1b is a longitudinal section of a stylus employed in the data processing system of FIG. 1a which may be cordless or wired to a tablet of the system.

To accomplish the foregoing, the 16 includes a grid of conductive element, and the electronic stylus 14 contains an electric coil (not shown) and a force transducer 71 (FIG. 1b). Generally, the coil in the stylus 14 inductively coupled to the grid in the tablet by either the coil or the grid with an voltage signal. The voltage signal induced in the other component is then measured and used to determine the position of the stylus relative to the various grid wires. This provides the position of the stylus in the plane of the tablet surface.

Preferably, the conductive elements of the tablet grid include (i) an x- and y-axis sampling circuit, where x and y are orthogonal axes in the plane of the tablet surface and (ii) a separate z-axis sampling circuit, where the z-axis is perpendicular to the tablet surface. To that end, while the x- and y-axis sampling circuit of the tablet grid determine position of the stylus in the plane of the tablet surface, the tablet grid z-axis sampling circuit determines distance between the stylus 14 and tablet surface along an axis perpendicular to the plane of the tablet surface.

Figure 1C:
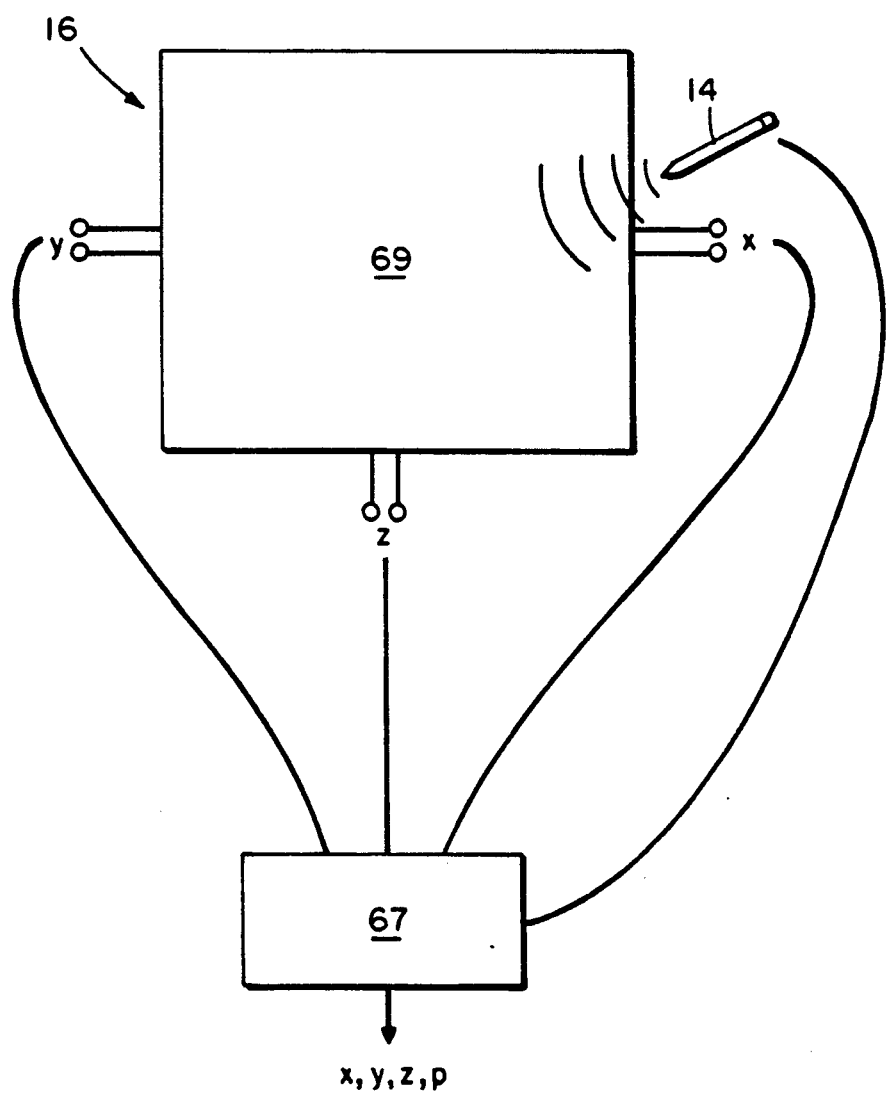

It is understood that a multiplicity of loop configurations for the sensing coils forming the x and y and the z sampling circuit are known in the art. Hence, FIG. 1c provides a block diagram of tablet 16 with blocked area 69 generally referring to the sensing coils of the x and y and z sampling circuits. It is noted, however, that positional phase discrepancies of the tablet sensing coils can be corrected computationally in tablet processor 67 or by a higher resolution loop such as a separate z-axis sensing loop used in the present invention.

The x- and y- axis and z-axis sampling circuits operate on a predetermined schedule and generate signals at x, y and z in FIG. 1c. The signals are subsequently received and digitized into respective quantitative values by tablet processor 67. The digitized values are used by processor 22 in FIG. 1a to provide an indication of position of the stylus 14 relative to the tablet 16 along the x, y and z axes.

In addition, force measurements p are generated from a force transducer 71 (FIG. 1b) in the stylus 14. Force measurements p indicate force exerted between the stylus end 30 and tablet surface. For each received set of x, y and z signals from the sampling circuits, tablet processor 67 samples force transducer 71 for a force measurement p and digitizes the p measurement. Subsequently, table processor 67 transmits to processor 22 a data packet formed of an x- and y-axis value, a corresponding z-axis value and a corresponding p measurement. The processor 22 used the transferred height (z-axis) and force (p) values to determine proximity of the stylus end 30 in relation to the tablet surface as follows.

For stylus end 30 at a height greater than about 2 cm above the tablet surface (i.e. z-axis value greater than 0 and p=0), tablet processor 67 does not encode nor transmit data packets to processor 22. Thereupon, processor 22 refrains from displaying a cursor for stylus end 30 in the screen view 26 on display unit 18.

For stylus end 30 at a height of about 2 cm or less above the tablet surface but not in contact therewith (i.e. z-axis value greater than 0 and p=0), processor 22 determines stylus end 30 to be in the working range in which a user holds the stylus 14 during operation thereof above tablet 16 between strokes. Hence, processor 22 displays on display unit 18 a cursor indicative of x-y position of the stylus end 30 with respect to the tablet 16 and, consequently, where a stroke will begin if and when the stylus end 30 makes contact with the tablet surface. Processor 22 continues to receive data packets from tablet processor 67 and continues to display the cursor in a screen position which corresponds to position of stylus end 30 relative to the tablet surface, as long as stylus end 30 is determined, by virtue of a received data packet, to be within the working range.

For stylus end 30 in contact with the tablet surface (i.e. z-axis value is zero and/or p is a positive non-zero value), processor 22 determines that stylus end 30 is being operated on the tablet surface. Hence, processor 22 operates in a pen-down mode supported by a pen-down software procedure discussed in the related patent application. During this mode, as the user moves the stylus 14 from one point to the next on the tablet surface, while maintaining stylus contact with the tablet surface and possibly varying force exerted between the stylus end and tablet surface, processor 22 receives data packets from the tablet processor 67. Each data packet has the form (x, y, z, p) of integer values defined at each processor sampling of the x- and y-axis circuit, z-axis circuit and force transducer 71. Approximate ranges of the values are x and y between 0 and 10,000 inclusive, and z and p between 0 and 255 inclusive.

In response, for each (x, y, z, p) data packet, processor 22 establishes a drawing primitive centered at the (x, y) position sensed in the tablet plane and having a shape (including width) defined as a function of sensed pressure p. A closely coupled sequence or series of drawing primitives results and forms the skeletal structure of the brushed stroke representative of stylus operation on the tablet 16.

Figure 2A:
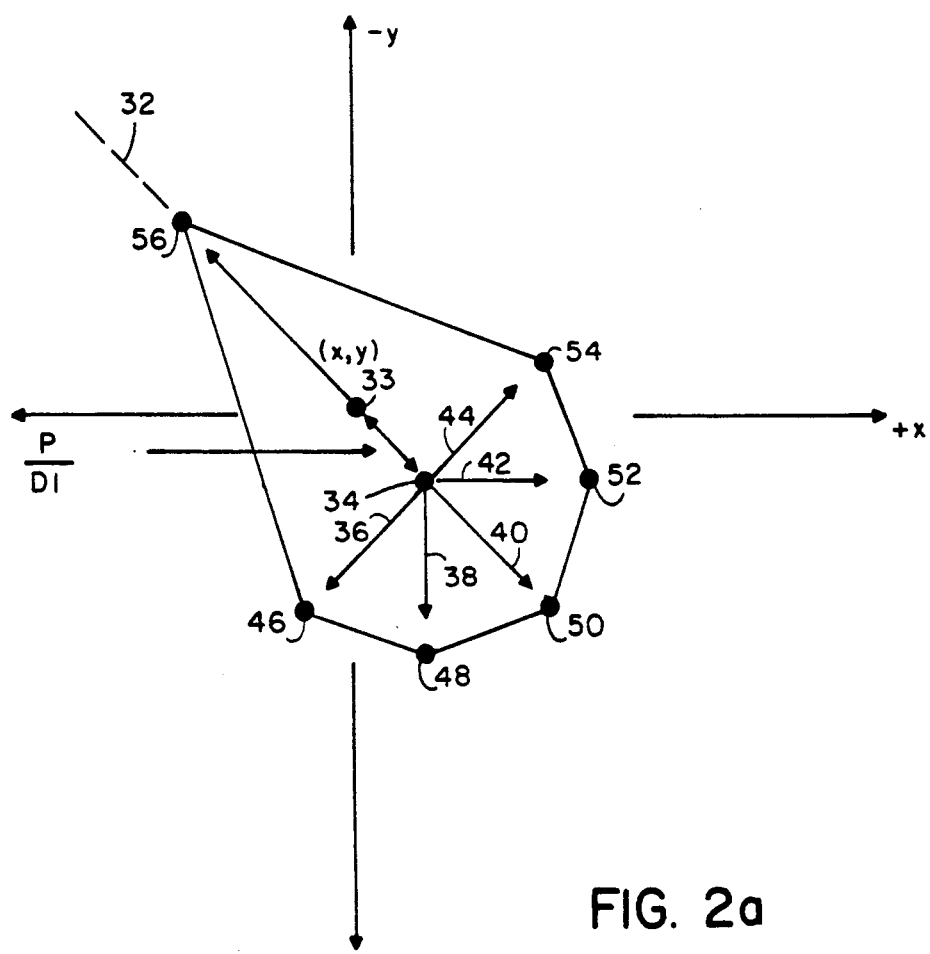
Figure 2B:
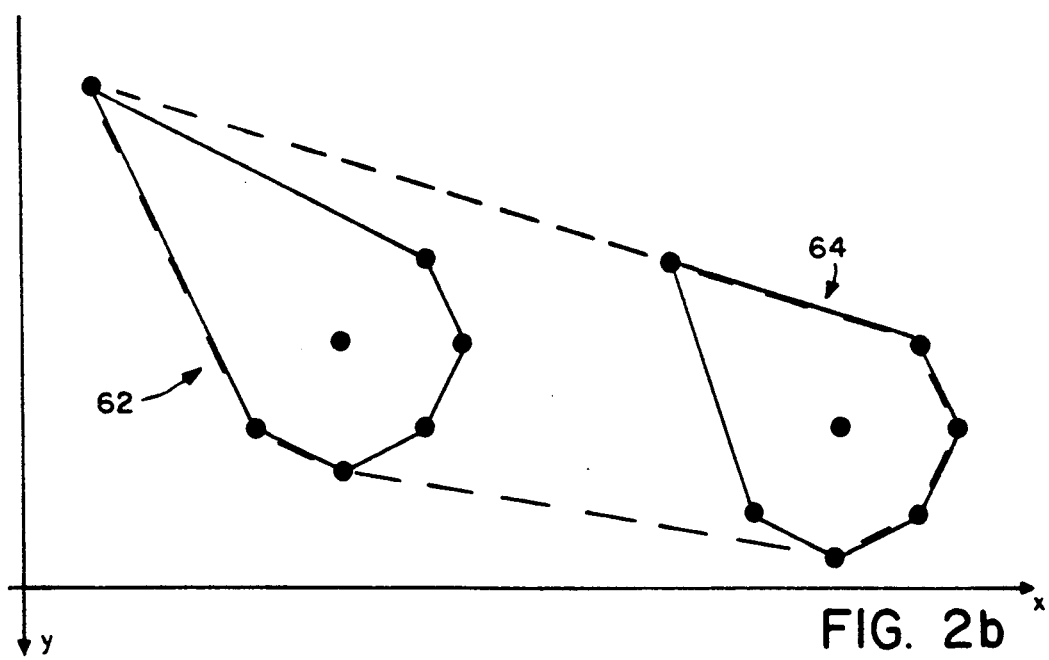

In a preferred embodiment for Eastern style calligraphy, the drawing primitive is a polygon approximating a teardrop shape 82 which is symmetrical about a line 32 that forms a 135° angle with the right hand horizontal in a Cartesian x, y plane as illustrated in FIGS. 2a-2b. For a received (x, y, z, p) data packet, the teardrop shape 82 is centered at the (x, y) sample point 33 and has six circumferential shape defining points (i.e. six points for approximating the teardrop shape). Each of the six points is defined as a function of sensed force.

In particular, stylus force transducer 71 detects force exerted in the range 0-500. Processor 22 receives an indicative signal of sensed force and scales the sensed force value to an integer value in the range 0-255. The scaled force value is divided by a positive, non-zero constant D1. A distance equal to this quotient is traversed downward from point 33 along center line 32 of the teardrop shape 82, to define lower center point 34. D1 is user definable and preferably an integer.

From lower center point 34 of the teardrop shape 82, five of the six circumferential shape defining points are determined along respective radial axes 36, 38, 40, 42 and 44, which respectively form angles of 225°, 270°, 315°, 0° and 45° with the right hand horizontal of the Cartesian x, y plane. Circumferential shape defining point 46 lies along radial axis 36, a distance from the lower center point 34, equal to (scaled force $+C1$)/D1. Circumferential shape defining point 48 lies along radial axis 38, a distance from the lower center point 34, equal to (scaled force $+C2$)/D1. Circumferential shape defining point 50 lies along radial axis 40, a distance from the lower center point 34, equal to (scaled force $+C3$)/D1. Circumferential shape defining point 52 lies along radial axis 42, a distance from the lower center point 34, equal to (scaled force $+C4$)/D1. Circumferential shape defining point 54 lies along radial axis 44, a distance from the lower center point 34, equal to (scaled force $+C5$)/D1. Constants C1 through C5 are user definable integers in the range 1 to about 10.

The sixth circumferential shape defining point 56 of the teardrop shape B2 is established with respect to the (x, y) position 33 given in the data packet. From that point, a distance equal to (scaled force $+C6$)/D2 is traversed upward along the center line 32 of the teardrop shape. Constant D1 is a multiple of Constant D2 which is user definable. Constant C6 is a user definable integer in the range of the other Cn constants.

It is noted that each circumferential shape defining point is determined with a respective Cn constant independent of and different from the other Cn constants. This allows the shape/widths of successive teardrop shape drawing primitives to increase or decrease in a staggered manner as detected force changes. In turn, processor 22 produces brushed strokes with a larger number of small changes in size and shape rather than a smaller number of large and noticeable changes.

By way of illustration and not limitation, the values for the Cn and Dn constants in one embodiment are as follows. D1=12, D2=4, C1=8, C2=6, C3=10, C4=9, C5=7, and C6=10. The values for the Cn constants are chosen such that each successive constant has a value different from the value of the preceding constant.

In another embodiment, for Western style calligraphy, the drawing primitive is a straight line of variable (force-determined) length and predetermined orientation with respect to the right hand horizontal of a Cartesian x, y plane. A preferred angle of orientation is $+45°$ from the right hand origin 0° in the Cartesian coordinate system. In the embodiment for Western style calligraphy, for each (x, y, z, p) data packet which the processor receives, processor 22 centers the line at the given (x, y) position and establishes width and length of the line as a function of p scaled as described above.

Figure 3:
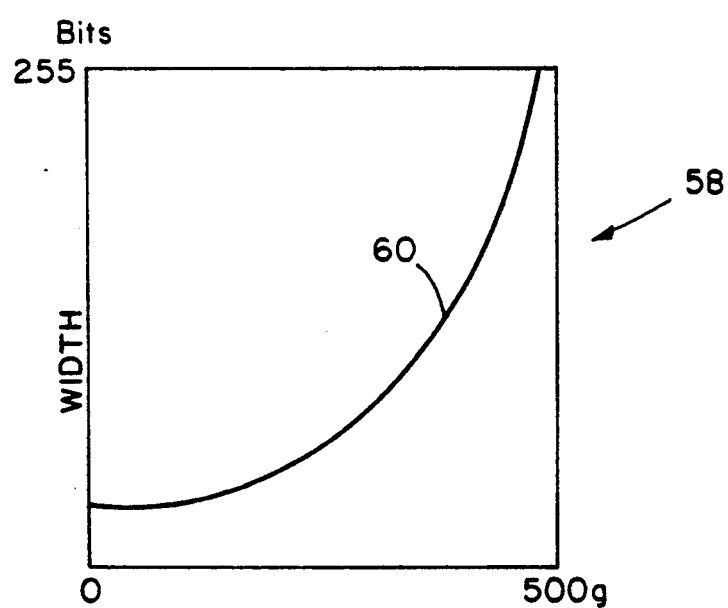
FIG. 3 is an illustration of a graph view displayed in the system of FIG. 1a for user establishment of the relationship between detected force and image stroke width.

In addition to allowing the user to define constants Cn and Dn that determine the relationship between sensed force and primitive shape and, hence, stroke width, the present invention allows the user to interactively define the function for scaling force (i.e. for determining the scaled force value from sensed force value). This is accomplished through a menu selection, function key or command which enables the user to request a stroke width versus sensed force graph to be displayed on display unit 18. Such a graph is illustrated in FIG. 3.

With the stylus 14, the user draws on the tablet surface, in the position corresponding to the screen position of the displayed graph 58, a desired curve 60 to define the relationship between sensed force and image stroke width. From the user drawn curve 60, processor 22 forms a table which maps the force axis values to corresponding width axis values of the points of the user provided curve. During processing of a drawing primitive from a received data packet, processor 22 performs a table lookup with the given p value of the data packet for the force axis value, and therefrom defines the scaled force value to equal the corresponding width axis value found in the table. This scaled force value is then used as described previously to determine the shape and width of the drawing primitive.

Whatever drawing primitive is employed, the processor 22 performs a fast polygon fill procedure to fill spaces (i.e. set pixels) between successive drawing primitives and within each drawing primitive, in a series of drawing primitives which define a brushed stroke indicative of user operation of the stylus on tablet 16. Specifically, after the circumferential shape defining points of a drawing primitive 62, and hence the perimeter or convex hull of a drawing primitive, are determined, processor 22 sorts the points in increasing Y order according to the orthogonal x, y axes of the screen view for display unit 18 as illustrated in FIG. 2b. Duplicate points are deleted, and points with the same y value are culled (i.e. of these only the point having the left most x value and, if distinct, the point having the right most x value are kept). The points which remain are used as input to call an N point Polygon Fill routine described later, which fills the current drawing primitive 62 (sets points therein).

As the user moves the stylus, maintaining the stylus end 30 in contact with the tablet surface, to a new position, a new tablet data packet is determined. In turn, a new drawing primitive 64 is derived using the x, y, z and p values of the new data packet and the predetermined Cn and Dn constant values as described above. The points of the former drawing primitive 62 and that of the new drawing primitive 64 are each sorted in the manner stated above. The remaining sorted points from both drawing primitives are merge sorted to form a list of sorted points. The list of sorted points is used as input to call the N point Polygon Fill routine to fill the convex hull of the combination of the two drawing primitives 62, 64, where the convex hull is determined from the points of the list with the left most and/or right most x values for each represented y level. That is, these points are the points of the former and new drawing primitives 62, 64 respectively which form a perimeter boundary about the two drawing primitives illustrated by the broken line in FIG. 2b.

The foregoing is repeated from point to point of a user generated stroke of the stylus 14 on the tablet 16 (i.e. during the time when operation of the stylus end contact with the tablet sur generate an image of a brushed stroke in view of display unit 18. As the stylus 14 moves from point to point of a stylus stroke (maintaining stylus contact with the tablet surface), the last drawing primitive is saved and used in conjunction with the current/new drawing primitive based on the most recently received data packet, to determine the brushed stroke indicative of the current user generated stylus stroke.

The filling of the brushed stroke section between established drawing primitives and, hence, between data packets, occurs within five milliseconds, which is the time between tablet data points at the fastest data rate possible. Because most calligraphy is performed at a somewhat slower pace than normal handwriting, and because of the importance placed on stroke quality, two hundred samples per second (with a 5 millisecond fill time) is a sufficient sampling speed, but is slow enough to compute and fill the current stroke path by the methods here described. This level of temporal resolution (200 points per second) gives very realistic calligraphy stroke feedback and is within the acceptable level for handwriting at normal speeds as described by M.J. Phillips in "Several Simple Steps Can Help You Choose the Correct Digitizer", *Computer Technology Review*. Volume 7, No. 1, Jan. 1987.

If 200 samples per second is insufficient (for reason of polygonal features that result from quickly executed curves), then artificial points may be generated and used as if part of the input data string (data packets). Such points may conveniently be computed by "spline curve" generation, a means well known of practitioners of computer graphics for drawing smooth curves through series of discrete points.

Also if the computational means is not always fast enough to compute one point's consequences before the next point arrives, then it may be arranged that the points (or slightly processed consequences of them) are put into a first in first out queue from which the processor 22 works to keep up as it is best able to do so. Thus, no input points (data packets) are lost and the only noticeable effect of temporary overload is slight momentary delay in the visual feedback through display unit 18. Alternatively, the software support for the present invention allows the user to slow the tablet data rate as desired through keyboard input, and is advantageous in the case where larger or more complicated geometric shapes are used for the drawing primitive.

Further, Applicants have discovered that a teardrop shape centered about the line which forms a 135° angle with the right hand horizontal of a Cartesian x, y plane most closely resembles the area of contact made with a calligraphy brush on a subject surface, at one moment in time, in Eastern style calligraphy. During use, the brush bristles, spread with increased applied force to form wider teardrop areas of contact. Conversely with a lifting of the brush less bristles contact the writing surface and form narrower teardrop areas of contact. The area of contact in the drawing of a calligraphy stroke is thus most closely resembled by a series of teardrop shapes of different widths and/or lengths. To that end, the present invention generates images of desired stylus strokes by forming a series of teardrop shaped primitives along the path of stylus 14 contact on the tablet surface and by changing width and/or length of the teardrop shape as a function of force exerted between the stylus and the tablet surface.

Figure 2C:
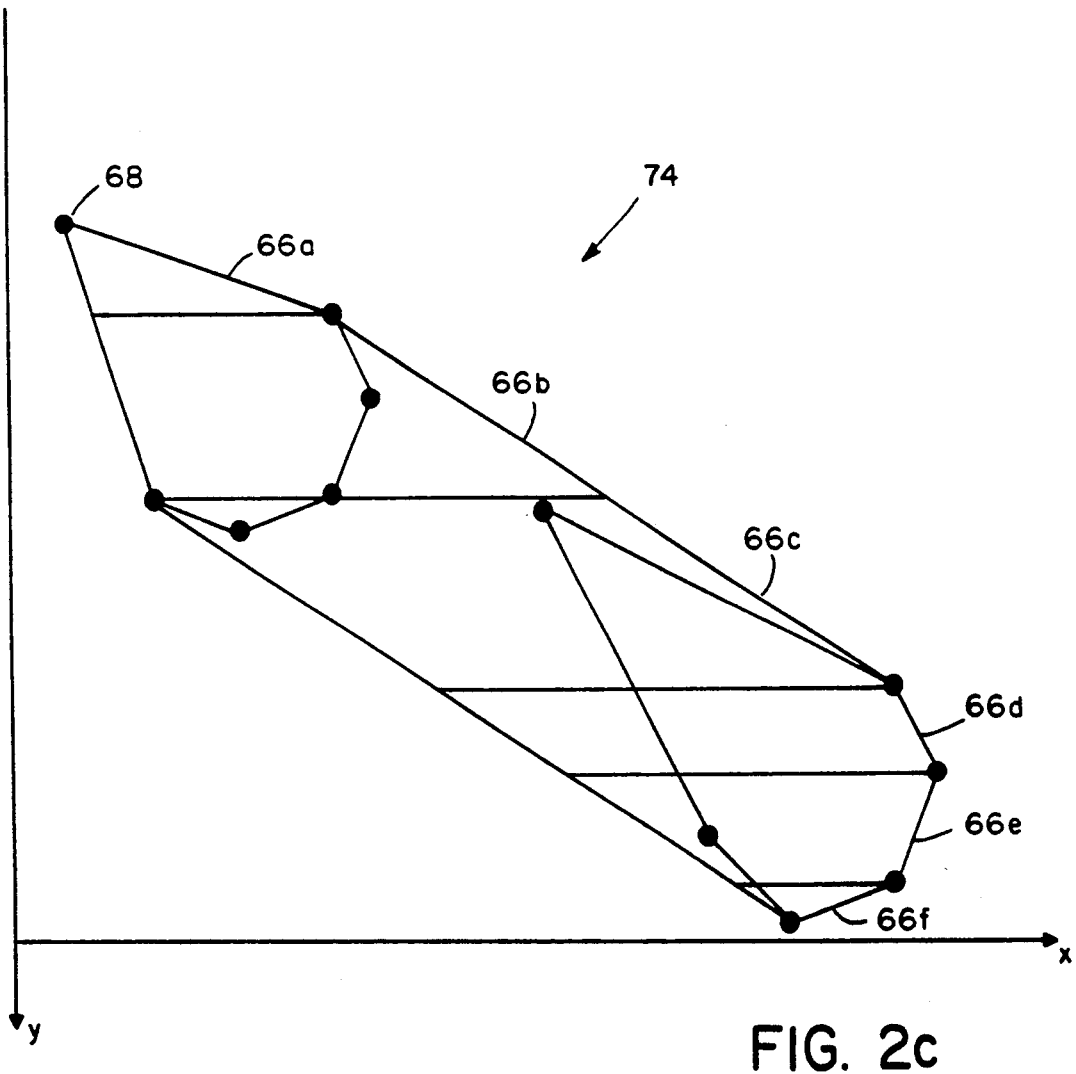
Figure 2D:
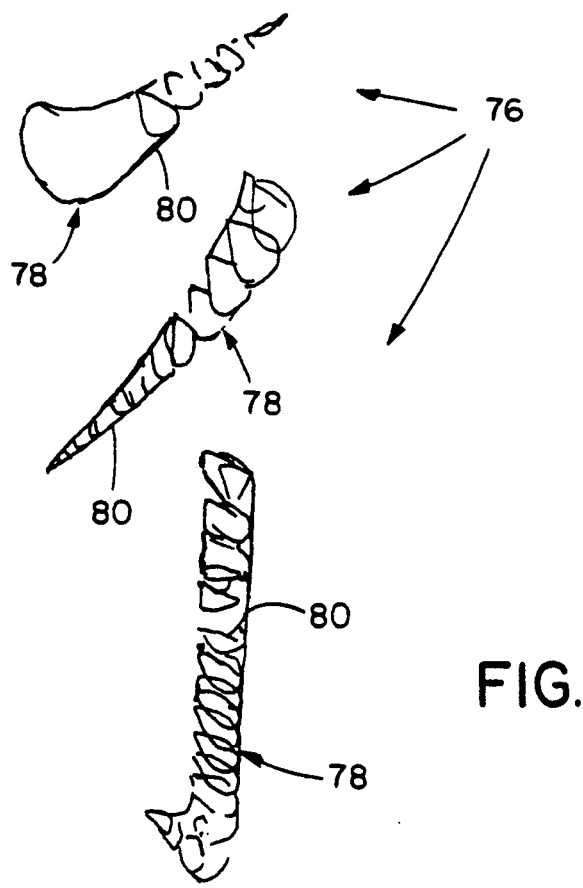

FIG. 2d illustrates images of calligraphied strokes generated by one embodiment of the present invention. Each imaged stroke 76 is a series of teardrop shaped primitives 78 oriented about the line which forms 135° with the right hand horizontal of the Cartesian x, y plane. The teardrop shaped primitives 78 in a series have different widths and/or lengths to generally form the head, body and tail of the imaged stroke 76. More specifically, the convex hull defined by a series of teardrop shaped primitives 78 is filled by the N point Polygon Fill routine to establish an image stroke displayed on the display unit 18 in the present invention.

Figure 2E:
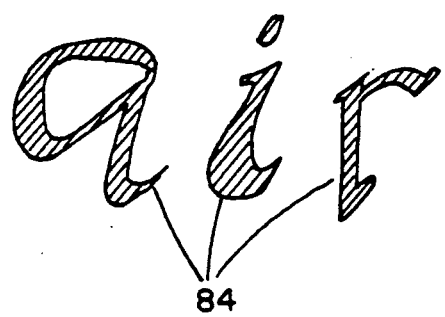

FIG. 2e illustrates images of Western calligraphied characters generated by another embodiment of the present invention. Each character image is formed by a series of line primitives 84 based on the same principles as the above described imaged strokes 76 of FIG. 2d. These imaged characters are representative of characters generated by a rigid broad end pen type brush with pen and ink. Hence, the present invention provides a computer driven stylus which provides real time brush operation comparable to practiced brush and ink calligraphy.

The N point Polygon Fill routine is outlined in Table I. The routine requires input of an integer number of points and a pointer to the array holding the convex hull (polygon perimeter) points or addresses thereof. Starting at the smallest Y level point 68 (Y increases downward in FIG. 2c) of the subject convex hull 74, the routine divides the convex hull into constituent trapezoids 66a–66f as illustrated in FIG. 2c. Each trapezoid 66 consists of one or two points on each of one or two possible y levels. And, each trapezoid 66 has a horizontal top at a y level of one point of the convex hull and a horizontal bottom at a y value of another point of the convex hull. The point of the convex hull which defines the bottom horizontal of a trapezoid 66, is the point which makes the right most or left most slope with the right most or left most point, respectively, of the top horizontal of the trapezoid. With each constituent trapezoid 66, the routine calls a trapezoid fill routine, which fills the trapezoid with horizontal lines using Bresenham's line algorithm to determine the successive line end points.

TABLE I

```
FillPoly (number_of_points, point_array)/* Fill the convex hull of a polygon */
    integer number_of_points;
    point*point_array;
{
    integer index = 0; /* index into the point array at the current point */
    integer top_left, top_right, top_y, leftmost = 0, rightmost = 0;
    if there are no points, return;
    if there is one point, set that points's pixel, and return;
    if there are two points, draw the line joining them and return;
    /* Assume that all points in the point_array variable are sorted in increasing Y, with no duplicates,
       and that points with the same Y value are sorted for leftmost and rightmost X values. */
```

TABLE I-continued

```
Find the number of points on the topmost line → index;
Find the leftmost and rightmost X values on the topmost Y line, and set variables top_left,
   top_right, top_y;
Set the topmost level of a trapezoid at (top_left, top_right, top_y)
while (index < number_of_points)
{
    If current point's Y value is equal to the greatest Y value, break from while loop;
    Find index of point with leftmost slope from top_left, top_right,
        and top_y → leftmost
    Find index of point with rightmost slope from top_left, top_right,
        and top_y → rightmost
    if (the rightmost point's Y value is < leftmost points's Y value) then
    {
        Find the correct X value intersecting the line made by (top_left, top_y) and
            leftmost point at the rightmost point's Y level → top_left
        Fill a new trapezoid from previous trapezoid to (top_left, rightmost point's X,
        rightmost point's Y)
        index = rightmost + 1
        last_right = rightmost point's X value
        last_y = rightmost point's Y value
    }
    else if(the leftmost point's Y value is < the rightmost point's Y value) then
    {
        Find the correct X value intersecting the line made by (top_right, top_y)
            and rightmost point at the leftmost point's Y level → top_right
        Fill a new trapezoid from previous trapezoid to (leftmost point's X, top_right, leftmost
            point's Y)
        index = leftmost + 1
        last_left = leftmost point's X value
        last_y = leftmost point's Y value
    }
    else /* leftmost = = rightmost */
    {
        Fill a new trapezoid from previous trapezoid to (leftmost point's X, rightmost point's X,
            leftmost's Y)
        index = rightmost + 1 /* remember multiple Y's are sorted L to R */
        last_right = rightmost point's X
        last_left = leftmost point's X
        last_y = leftmost point's Y /* could also be rightmost point's Y value */
    }
}
if(index < number_of_points) Draw a trapezoid to the greastest Y level's leftmost and rightmost points;
return;
```

From the filled convex hulls (i.e. convex hulls whose inner points and boundary points are set), processor 22 sets bits of a bitmap, or raster lines or the like, to display on display unit 18 an image of the created brushed stroke. The speed of the fast polygonal fill procedure enables real time brushed strokes (i.e. images thereof) to be created on the display unit 18 in response to user operation of the stylus 14 on the tablet 16 in a brush imitating manner. To prevent stray marks or line segments from appearing on the created brushed strokes, the processor 22 does not draw primitives for data points with detected zero force values. Thus very slow transition from pen down to pen up or vice versa do not leave traces during the zero force episode.

Figure 5:
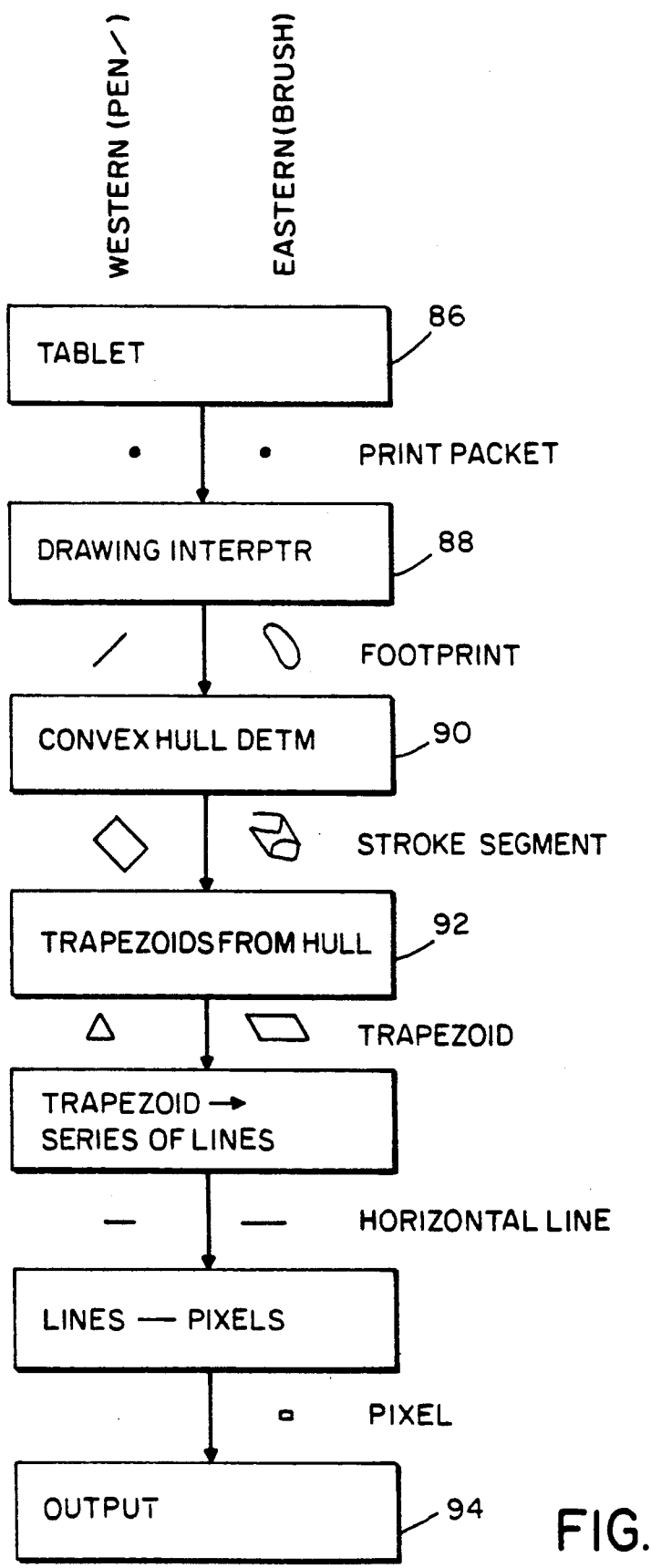
FIG. 5 is a diagram illustrating the successive stages of data transformation accomplished by a series of processes in the software support of the present invention.

FIG. 5 illustrates program modules for implementing the foregoing in a software program which supports the data processing system of the present invention. A tablet module 86 enables tablet processor 67 to collect data from tablet 16 and stylus 14 and to therefrom generate the (x, y, z, p) data packets for each sample point. Drawing interpreter module 88 in processor 22 receives data packets from tablet module 86 and defines a primitive for each sample point (data packet) as described previously with respect to constants Cn and Dn and the like. Module 90 determines the convex hull of one or two primitives. As described previously, module 90 accomplishes this by a sorting routine. From module 90 a module 92 is called to (i) divide the convex hull into trapezoids, (ii) divide each trapezoid into a series of horizontal lines, and (iii) set the pixels defining each line. Module 92 includes the N point Polygon Fill routine of Table I. From module 92, an output module 94 receives an indication of the pixels which when set provide the desired image of a brushed stroke indicative of user operation of the stylus 14 on tablet 16.

Figure 4:
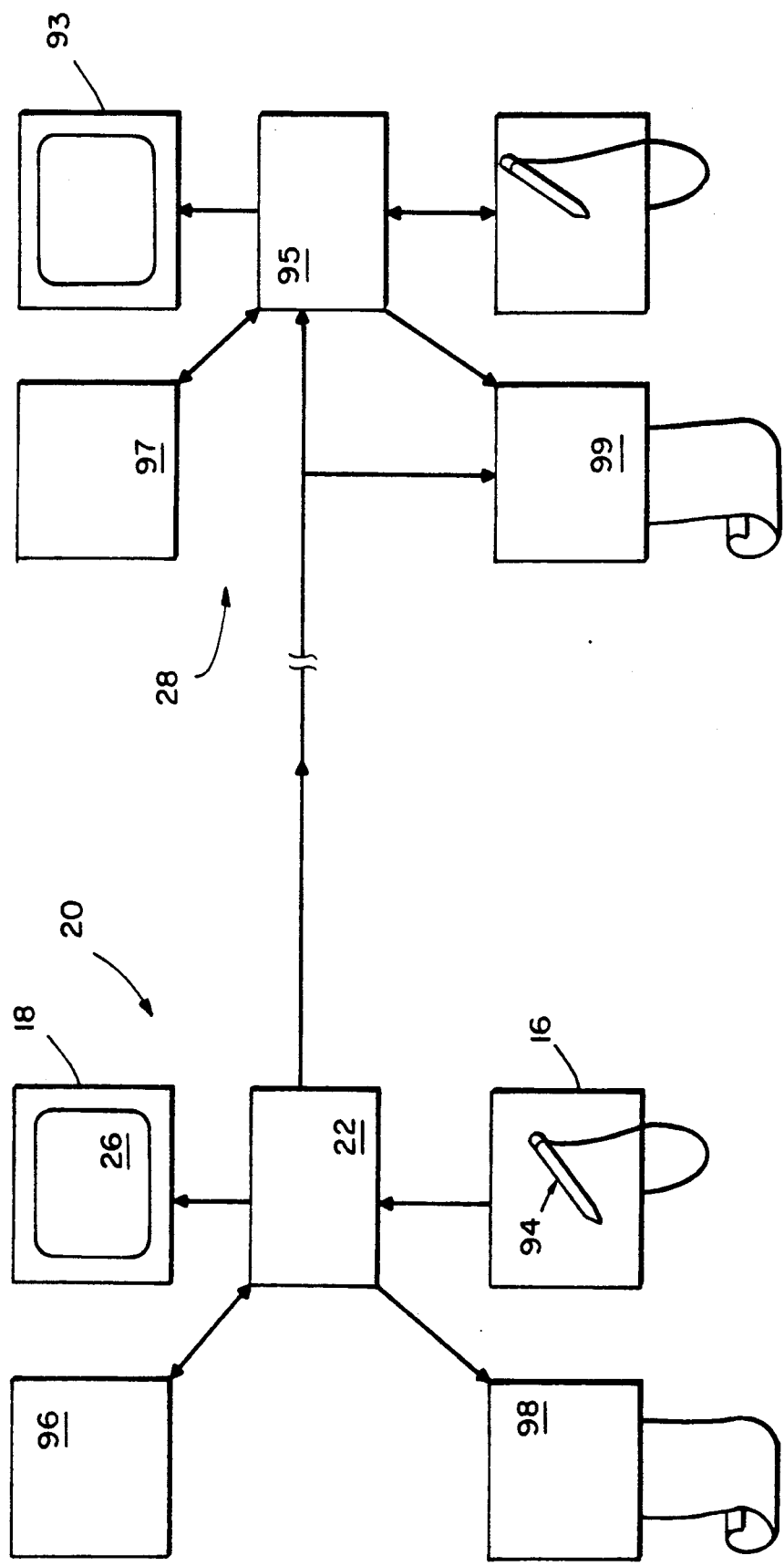
FIG. 4 is a block diagram of a network of data processing systems which embody the present invention.

The output module 94 not only supports local screen view 26 (FIG. 1a) but also enables other local and/or remote output as illustrated in FIG. 4. Within the local data processing system 20, module 94 also enables processor 22 to store the brushed stroke image (pixel) information in local, non-volatile memory 96, and to print hard copy output on a local printer 98. External to the local data processing system 20 (i.e. in a network of processing systems), module 94 enables processor 22 to transmit bitmaps, (x, y, z, p) data packets and delimiters, trapezoids, or individual pixel information, or the like to a remote processing station 28 or partial one thereof. In remote processing station 28, a remote processor 95 supported by a similar output module 94 receives the data. In turn, remote processor 95 stores the received data in memory 97 local to processor 95, displays images from the received data on a display unit 93 local to processor 95, and/or prints hard copy output on a printer 99 local to processor 95. It is understood that the remote devices are mentioned in the alternative such that any of the devices may be coupled to remote processor 95 to form remote processing station 28.

It is noted that the hard copy output (local or remote) is typically of higher resolution than the interactive screen display. A longer processing time, probably required for this and higher resolution, for this output does not pose further problems (of the type discussed previously) because the hard copy output does not need to be generated in real time.

While the invention has been particularly shown and described with reference to a preferred embodiment thereof, it will be understood by those skilled in the art that various changes in form and details may be made therein without departing from the spirit and scope of the invention as defined by the appended claims.

For example, the line about which the drawing primitive is centered may be continuously rotating through 360° of a Cartesian x-y plane. This produces a change in orientation of image stroke. That is, the position of narrowing stroke parts changes according to the change in angle of the rotating center line. To that end, the resulting image stroke displayed on the display unit replicates the western calligraphic ink strokes formed by the calligrapher twisting the brush/pen between his/her fingers while he/she writes. Software for continuously rotating the center line includes a loop which changes angle of the center line from 0° through 360°.

As another example, the number of points constituting the convex hull of the drawing primitive can be any value, not necessarily 6 as described above. This results in a smoother curved convex hull, for example an approximate circle which might be appropriate in a computer model of a felt tip pen.

In another example, stylus 14 may enable erasure of strokes as described in related U.S. Pat. application Ser. No. 200,091. For the present invention, erasure by stylus 14 is accomplished by (i) providing an erasure mode for stylus end (either working end) contact to the tablet surface upon user command (ii) forcing to white, instead of black, of the pixels of an imaged brush stroke as the stylus end traverses over corresponding parts of the imaged brush stroke; and (iii) forcing to white a wider band of set pixels as a function of detected user applied force.

We claim:

1. Computer writing apparatus for brush style writing comprising:

a video display unit supported by a bitmap;

a stylus operable on a working surface in a brush imitating manner, one of the stylus and the working surface generating signals indicative of brush imitating operation of the stylus on the working surface; and processor means coupled between the stylus and the video display unit for receiving signals indicative of a brush imitating operation of the stylus, the signals being generated by one of the stylus and the working surface, the processor means establishing from the signals images of brushed strokes corresponding to the brush imitating operation of the stylus for display on the video display unit, geometric characteristics including shape and size of the brushed strokes varying as a function of operation including at least one of tilt, force and orientation of the stylus on the working surface, each brushed stroke image being formed of a series of certain shaped elements, each certain shaped element having a plurality of points for enabling staggered changes between elements, and the processor means forming each brushed stroke image on the video display bitmap by (i) determining points of the certain shaped elements which lie on a perimeter boundary about the series of certain shaped elements, (ii) establishing with the determined points trapezoidal areas within and including the perimeter boundary, and (iii) setting scan lines of pixels in a pattern corresponding to the established trapezoidal areas, such that the processor means drives the video display unit to display the established images of brushed strokes in real time on the video display unit during stylus operation on the working surface.

2. Computer writing apparatus as claimed in claim 1 further comprising a graph view displayable on the display unit; and wherein the signals generated by one of the stylus and the working surface includes a force signal for indicating force exerted between the stylus and working surface throughout operation of the stylus such that the processor means provides images of brushed strokes with widths that vary as a function of force, the graph view enabling user definition of the function of force to brushed stroke width.

3. Computer writing apparatus as claimed in claim 1 wherein geometric characteristics of the brushed strokes further includes orientation of the brushed strokes.

4. Computer writing apparatus as claimed in claim 1 wherein the function of operation of the stylus further includes at least one of (i) direction of stylus movement on the working surface, (ii) length of time of contact between the stylus and working surface, (iii) distance traversed on the working surface while contact is made between the stylus and the working surface and (iv) position of the stylus on the working surface.

5. Computer writing apparatus as claimed in claim 1 wherein the certain shaped elements are teardrop shaped elements and each teardrop shaped element is defined by a plurality of points, each point being defined by a respective predetermined constant value, different points being defined by different predetermined constant values such that the teardrop shaped elements in a series have different lengths and widths.

6. Computer writing apparatus as claimed in claim 5 wherein the predetermined constant values are user predefinable.

7. Computer writing apparatus as claimed in claim 1 wherein the certain shaped elements are lines of a variable length.

8. Computer writing apparatus as claimed in claim 1 further comprising print means coupled to the processor means for providing hard copy output of the established images from the processor means.

9. In a data processing system having a digital processor, a video display unit coupled thereto and print means coupled to the digital processor, input apparatus comprising:

a stylus coupled to the digital processor, the stylus being operable on a working surface in a stroke drawing manner to provide user generated strokes as input to the digital processor;

force detecting means coupled to the digital processor for detecting force exerted between the stylus and the working surface during user generation of each stroke with the stylus;

processor means coupled to the digital processor for receiving the user generated strokes and respective detected forces, and for establishing therefrom images of brush-like strokes indicative of the user generated strokes, each image stroke having geometries including a shape and a size determined as a function of the respective detected force of a user generated stroke, and each image stroke being formed of a series of certain shaped elements, each certain shaped element having a plurality of points enabling staggered changes between elements; and a subroutine employed by the processor for forming each image stroke on a bitmap by (i) determining points of the certain shaped elements which lie on a perimeter boundary about the series of certain shaped elements, (ii) establishing with the determined points trapezoidal areas within and including the perimeter boundary, and (iii) setting pixels in a pattern corresponding to the established trapezoidal areas, such that the processor means enables the digital processor to support, on the video display unit, realtime display of images of brush-like strokes indicative of user generated strokes.

10. Input apparatus as claimed in claim 9 wherein the certain shaped elements are teardrop shaped elements, and each teardrop shaped element is defined by a plurality of points, each point being defined by a respective predefined constant value, different points being defined by different predefined constant values such that the teardrop shaped elements in a series have different lengths and widths.

11. Input apparatus as claimed in claim 10 wherein the predefined constant values are user predefinable.

12. Input apparatus as claimed in claim 9 wherein the certain shaped elements are lines of variable lengths.

13. Input apparatus as claimed in claim 9 further comprising a graph view displayable on the video display unit, the graph view enabling user definition of the function for determining geometries of an image stroke.

14. Input apparatus as claimed in claim 9 wherein the processor means further enables the digital processor to support the print means to provide hard copy output of imaged strokes generated by the processor means.

15. In a data processing system having a digital processor and a video display units, computer writing apparatus comprising:

a stylus coupled to the digital processor of the data processing system, the stylus being operable on a working surface in a brush imitating manner, one of the stylus and the working surface generating signals indicative of brush imitating operation of the stylus on the working surface;

processor means coupled to the digital processor for receiving signals indicative of a brush imitating operation of the stylus on the working surface, the signals being generated by one of the stylus and the working surface, the processor means establishing from the signals images of brushed strokes corresponding to the brush imitating operation of the stylus, width of the brushed strokes varying as a function of operation including at least one of tilt, force and orientation of the stylus on the working surface, each brushed stroke image established by the processor means being formed of a series of fixed orientation teardrop shaped elements, length and width of each teardrop shaped element varying independently as a function of force such that width of the brushed strokes vary as a function of operation of the stylus on the working surface and provide staggered changes between teardrop shaped elements; and a subroutine employed by the processor means for forming each brushed stroke image on a bit map by (i) determining points of the teardrop shaped elements which lie on a perimeter boundary about the series of teardrop shaped elements, (ii) establishing with the determined points trapezoidal areas within and including the perimeter boundary, and (iii) setting pixels in a pattern corresponding to the established trapezoidal areas, such that the processor means enables the digital processor to support realtime display of the established images of brushed strokes on the video display unit of the data processing system during stylus operation on the working surface.

16. Computer writing apparatus as claimed in claim 15 wherein each teardrop shaped element is defined by a plurality of points, each point being defined by a respective predefined constant value, different points being defined by different predefined constant values such that the teardrop shaped elements in a series have different lengths and widths.

17. Computer writing apparatus as claimed in claim 16 wherein the predefined constant values are user predefinable.

18. Computer writing apparatus as claimed in claim 15 further comprising print means coupled to the digital processor for providing hard copy output of established images from the processor means.

* * * * *